(12) United States Patent
Liu

(10) Patent No.: US 12,294,303 B2
(45) Date of Patent: May 6, 2025

(54) POWER SUPPLY SYSTEM AND MULTIPATH POWER CONVERTER CIRCUIT THEREOF

(71) Applicant: Richtek Technology Corporation, Zhubei (TW)

(72) Inventor: Chih-Lun Liu, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 770 days.

(21) Appl. No.: 17/581,906

(22) Filed: Jan. 22, 2022

(65) Prior Publication Data

US 2022/0278617 A1     Sep. 1, 2022

Related U.S. Application Data

(60) Provisional application No. 63/154,636, filed on Feb. 26, 2021.

(30) Foreign Application Priority Data

Jul. 26, 2021   (TW) .................................. 110127425

(51) Int. Cl.
*H02J 7/00* (2006.01)
*H02M 3/158* (2006.01)

(52) U.S. Cl.
CPC ....... *H02M 3/1582* (2013.01); *H02J 7/00712* (2020.01); *H02J 2207/20* (2020.01)

(58) Field of Classification Search
CPC . H02M 3/1582; H02J 7/00712; H02J 2207/20
See application file for complete search history.

(56) References Cited

U.S. PATENT DOCUMENTS

2017/0279284 A1\*   9/2017   Lim ..................... H02J 7/0045

\* cited by examiner

*Primary Examiner* — Robert Grant
(74) *Attorney, Agent, or Firm* — Tung & Associates

(57) ABSTRACT

A power supply system includes: a switching buck-boost converter configured to operate an inductor, so as to convert an input power at a first node to a first output power at a second node, wherein first output voltage of the first output power is higher than, lower than or equal to an input voltage of the input power; a battery coupled to a third node; a first transistor coupled between the first node and the third node; and a second transistor coupled between the second node and the third node. The switching buck-boost converter, the first transistor and the second transistor operate to supply power to a load circuit and/or to charge the battery, wherein the load circuit is coupled to the second node in a removable manner to receive power.

20 Claims, 9 Drawing Sheets

US 12,294,303 B2

POWER SUPPLY SYSTEM AND MULTIPATH POWER CONVERTER CIRCUIT THEREOF

CROSS REFERENCE

The present invention claims priority to U.S. 63/154,636 filed on Feb. 26, 2021 and claims priority to TW 110127425 filed on Jul. 26, 2021.

BACKGROUND OF THE INVENTION

Field of Invention

The present invention relates to a power supply system; particularly, it relates to a power supply system and a multipath power converter circuit of such power supply system, wherein transistors are employed as switches and/or employed to form a linear charging circuit.

Description of Related Art

Please refer to FIG. 1, which shows a schematic diagram of a conventional charging system 1000. The conventional charging system 1000 includes: a headphone charger station 100 and a wireless headphone 200. The headphone charger station 100 includes: a switching charger 110, a switching buck-boost converter 120 and a battery 130. The switching charger 110 generates a system power VSYS1 according to an external power supply VTA provided from an adapter (not shown). The system power VSYS1 serves to generate a charging power supply VBAT1 for charging the battery 130. Additionally, the system power VSYS1 also can be converted to an output power (e.g., corresponding to VOUT shown in FIG. 1) via the switching buck-boost converter 120, so as to provide the output power to the wireless headphone 200. The wireless headphone 200 generates a system power VSYS2 and a charging power supply VBAT2 via a linear charger 210. The system power VSYS2 is supplied to a wireless unit 220, whereas, the charging power supply VBAT2 serves to charge a battery 230.

Please refer to FIG. 2, which shows a headphone charger station 102 corresponding to the prior art in FIG. 1. The switching charger 110 can be for example a buck switching regulator, which generates the system power VSYS1 by operating an inductor L2 via switches QH~QL, whereas, the switching buck-boost converter 120 generates the output power (e.g., corresponding to VOUT shown in FIG. 2) by operating an inductor L1 via switches QA~QD, so as to supply the output power to the wireless headphone 200.

The prior art shown in FIG. 1 and FIG. 2 has the following drawbacks that: it is required for the prior art shown in FIG. 1 and FIG. 2 to adopt two-stages of switching power regulators, resulting in higher cost and larger size.

In view of the above, to overcome the drawbacks in the prior art, the present invention proposes an innovative power supply system and a multipath power converter circuit thereof which are capable of reducing manufacturing cost as well as circuit size.

SUMMARY OF THE INVENTION

From one perspective, the present invention provides a power supply system, comprising: a switching buck-boost converter, which is configured to operate an inductor so as to convert an input power at a first node to a first output power at a second node, wherein a first output voltage of the first output power is higher than, lower than or equal to an input voltage of the input power; a battery coupled to a third node; a first transistor coupled between the first node and the third node; and a second transistor coupled between the second node and the third node; wherein the switching buck-boost converter, the first transistor and the second transistor are configured to supply power to a load circuit and/or to charge the battery; wherein the load circuit is coupled to the second node in a removable manner to receive power.

From another perspective, the present invention provides a multipath power converter circuit, comprising: a switching buck-boost converter, which is configured to operate an inductor so as to convert an input power at a first node to a first output power at a second node, wherein a first output voltage of the first output power is higher than, lower than or equal to an input voltage of the input power; a first transistor coupled between the first node and a third node; and a second transistor coupled between the second node and the third node; wherein the switching buck-boost converter, the first transistor and the second transistor are configured to supply power to a load circuit and/or to charge a battery, wherein the battery is coupled to the third node; wherein the load circuit is coupled to the second node in a removable manner to receive power.

In one embodiment, wherein in an independent power supply mode, the switching buck-boost converter is configured to operably convert the input power at the first node to the first output power at the second node, so as to supply power to the load circuit, wherein the first transistor is configured to operate in a linear region to operably convert the input power at the first node to a second output power at the third node by linear regulation, so as to charge the battery via the second output power, wherein the second transistor is OFF, and wherein the input power corresponds to an external power supply received at the first node.

In one embodiment, in a parallel power supply mode, the switching buck-boost converter is configured to operably convert the input power at the first node to the first output power at the second node, so as to supply power to the load circuit, wherein when the second transistor is ON, the first output power is electrically connected to the third node, so as to charge the battery via the first output power, wherein the first transistor is OFF, and wherein the input power corresponds to an external power supply received at the first node.

In one embodiment, in a battery power supply mode, the switching buck-boost converter is configured to operably convert the input power at the first node to the first output power at the second node, so as to supply power to the load circuit, wherein when the first transistor is ON, the third node is electrically connected to the first node, wherein the input power corresponds to a power supply provided by the battery at the first node, and wherein the second transistor is OFF.

In one embodiment, in a battery charging power supply mode, the switching buck-boost converter is configured to operably convert the input power at the first node to the first output power at the second node, wherein when the second transistor is ON, the first output power is electrically connected to the third node, so as to charge the battery via the first output power, wherein the first transistor is OFF, and wherein the input power corresponds to an external power supply received at the first node.

In one embodiment, the switching buck-boost converter includes: a first switch coupled between the first node and a first switching node; a second switch coupled between the first switching node and a ground level; a third switch coupled between a second switching node and the ground level; and a fourth switch coupled between the second node and the second switching node; wherein the first switch, the second switch, the third switch and the fourth switch are configured to operate the inductor, so as to convert the input power at the first node to the first output power at the second node.

In one embodiment, the input power corresponds to an external power supply received at the first node, wherein in a bypass mode, the first switch and the fourth switch are always ON, whereas, the second switch and the third switch are always OFF, so that the first node is electrically connected to the second node, wherein when the first transistor is ON, the third node is electrically connected to the first node, wherein the second transistor is OFF, so that the external power supply directly charges the battery.

In one embodiment, in the bypass mode, the external power supply provides a constant current, wherein the switching buck-boost converter is configured to directly charge the battery by the constant current.

In one embodiment, the first transistor includes: a first sub-transistor and a second sub-transistor which are connected in series, wherein a body diode of the first sub-transistor is reversely coupled to a body diode of the second sub-transistor.

In one embodiment, the second transistor includes: a first sub-transistor and a second sub-transistor which are connected in series, wherein a body diode of the first sub-transistor is reversely coupled to a body diode of the second sub-transistor.

Advantages of the present invention include: that the present invention can supply power to a load circuit and in the meantime charge a battery concurrently, and feedback a charging voltage of the battery to the load circuit; that the present invention can reduce the required number of switches and the required number of inductors; and that the present invention can improve charging efficiency, reduce power consumption, reduce circuit size and reduce manufacturing cost.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
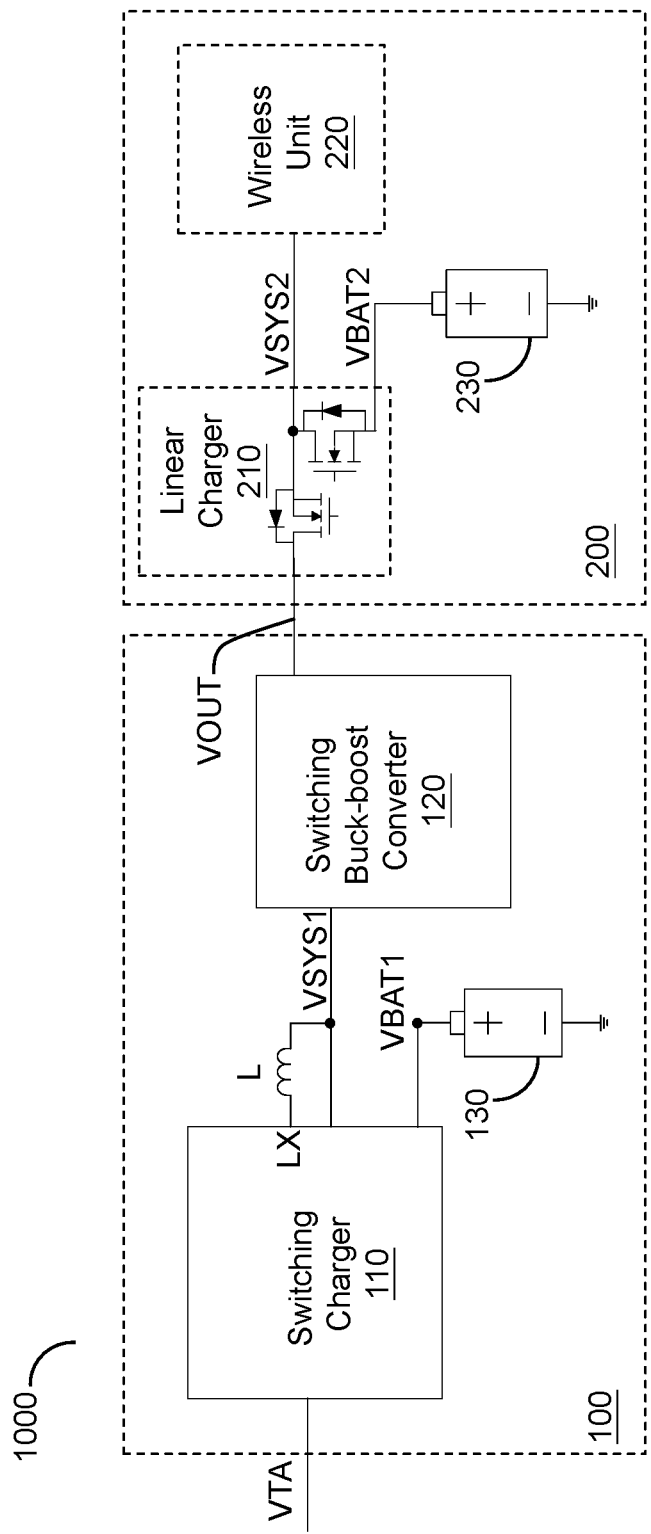
FIG. 1 shows a schematic diagram of a conventional charging system.
Figure 2:
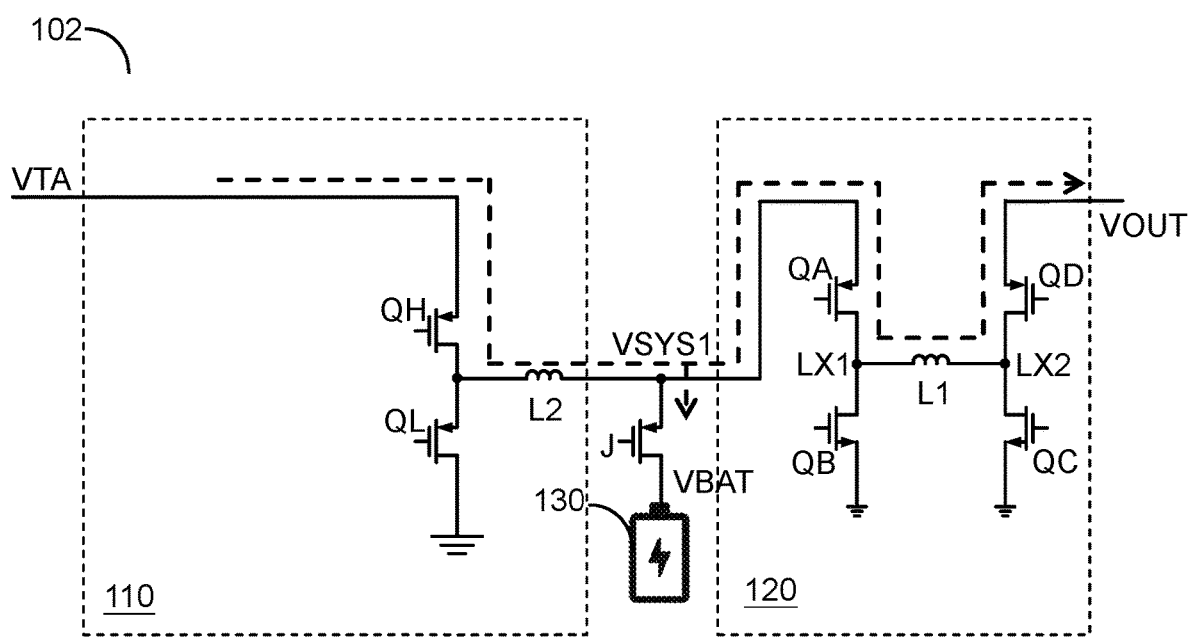
FIG. 2 shows a headphone charger station corresponding to the prior art in FIG. 1.
Figure 3:
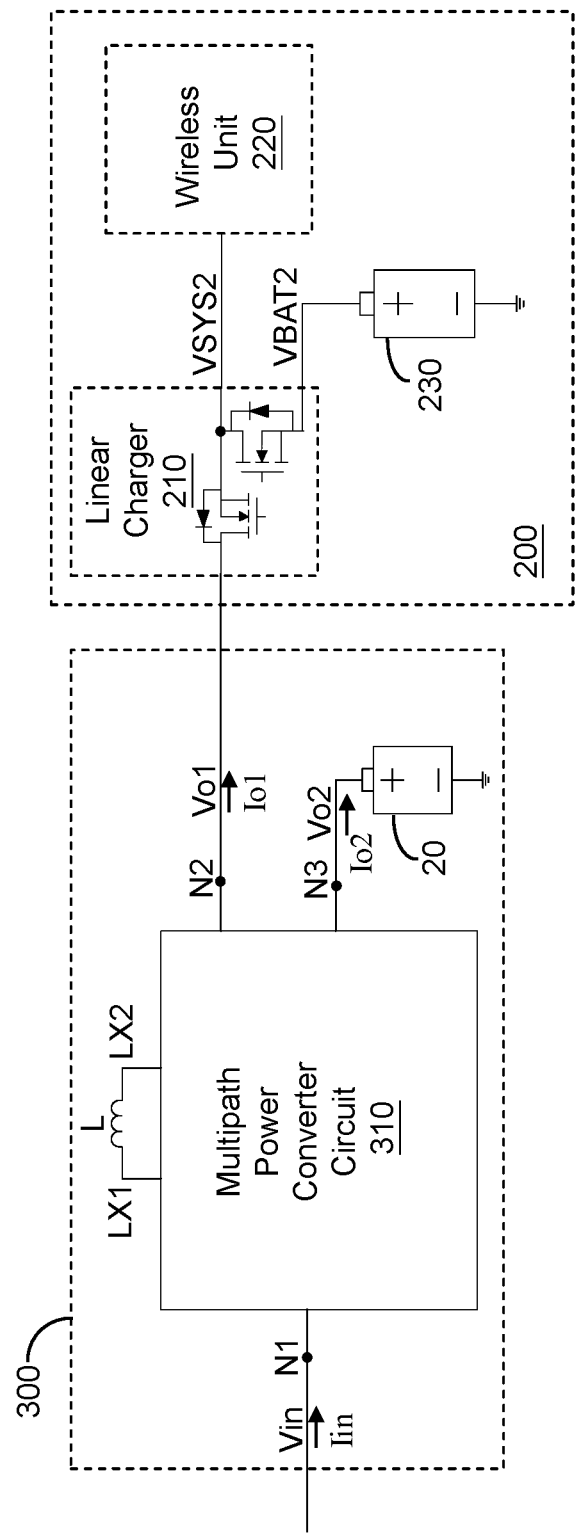
FIG. 3 shows a schematic circuit diagram of a power supply system according to an embodiment of the present invention.

Please refer to FIG. 3, which shows a schematic circuit diagram of a power supply system 300 according to an embodiment of the present invention. As shown in FIG. 3, the power supply system 300 of the present invention includes a multipath power converter circuit 310. The multipath power converter circuit 310 is configured to operably convert an input power at a first node N1 to a first output power at a second node N2 and a second output power at a third node N3. The input power corresponds to an input voltage Vin and input current Iin. The first output power corresponds to a first output voltage Vo1 and a first output current Io1. The second output power corresponds to a second output voltage Vo2 and a second output current Io2. The first output power supplies supply power to a load circuit, whereas, the second output power charges a battery 20. As shown in FIG. 3, in one embodiment, the load circuit is for example at least one wireless headphone 200, whereas, the power supply system 300 is for example a headphone charger station capable of charging a headphone. The wireless headphone 200 serves to generate a system power VSYS2 and a charging power supply VBAT2 via a linear charger 210. The system power VSYS2 is supplied to a wireless unit 220, and also can be supplied to other headphones and driving circuits, whereas, the charging power supply VBAT2 serves to charge a battery 230. The multipath power converter circuit 310 is configured to operate an inductor L so as to control a voltage at a first switching node LX1 and a voltage at a second switching node LX2, to thereby achieve the above-mentioned power conversion.

Figure 4:
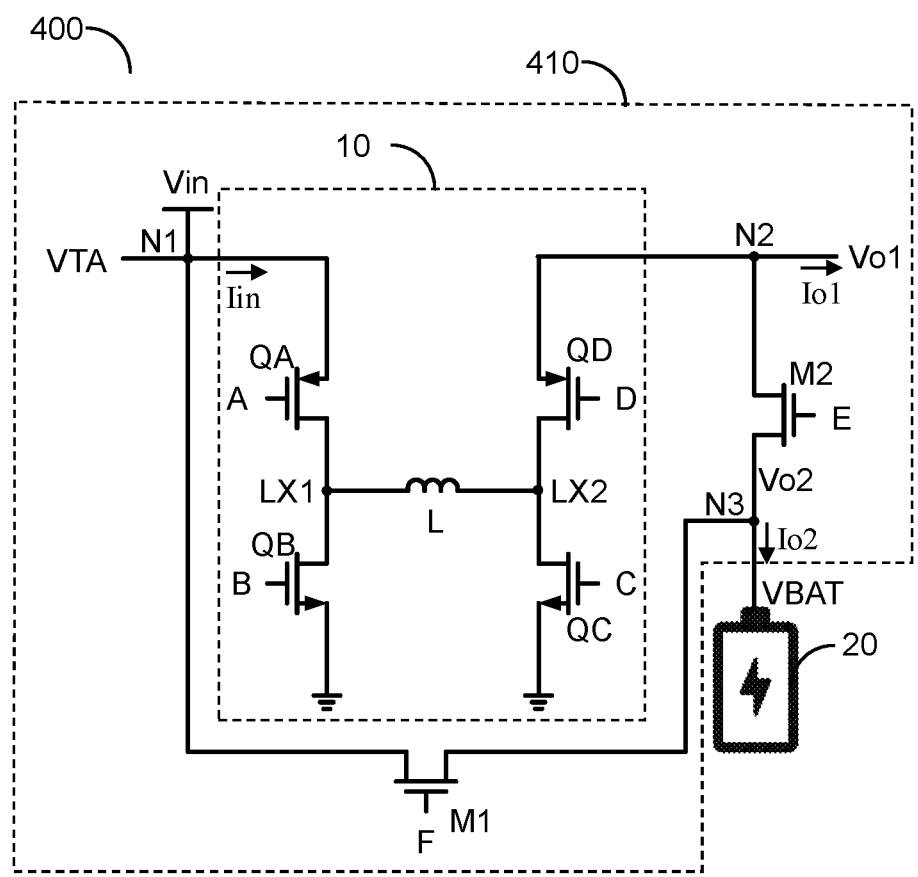
FIG. 4 shows a schematic circuit diagram of a power supply system according to a specific embodiment of the present invention.

Please refer to FIG. 4, which shows a schematic circuit diagram of a power supply system 400 according to a specific embodiment of the present invention. As shown in FIG. 4, the power supply system 400 of the present invention includes a multipath power converter circuit 410 and a battery 20; the multipath power converter circuit 410 includes a switching buck-boost converter 10, a first transistor M1 and a second transistor M2. That is, the power supply system 400 includes the switching buck-boost converter 10, the first transistor M1 and the second transistor M2, and the battery 20. The switching buck-boost converter 10 is configured to operably switch an inductor L, so as to convert an input power (corresponding to an input voltage Vin and an input current Iin) at a first node N1 to a first output power (corresponding to a first output voltage Vo1 and a first output current Io1) at a second node N2. The first output voltage Vo1 can be implemented as being higher than, lower than or equal to an input voltage Vin of the input power, depending upon different practical needs. The battery 20 is coupled to a third node N3. The first transistor M1 is coupled between the first node N1 and the third node N3. The second transistor M2 is coupled between the second node N2 and the third node N3. A control signal E is configured to operably control the first transistor M1, whereas, a control signal F is configured to operably control the second transistor M2. The switching buck-boost converter 10, the first transistor M1 and the second transistor M2 operate to supply power to a load circuit and/or to charge the battery 20, wherein the load circuit is coupled to the second node N2 in a removable manner to receive power. In one embodiment, the load circuit is for example at least one headphone, whereas, the power supply system 400 is for example a headphone charger station capable of charging a headphone.

Please still refer to FIG. 4. In one specific embodiment, the switching buck-boost converter 10 includes: a switch QA, a switch QB, a switch QC and a switch QD. The switch QA is coupled between the first node N1 and a first switching node LX1. The switch QB is coupled between the first switching node LX1 and a ground level. The switch QC is coupled between a second switching node LX2 and the ground level. The switch QD is coupled between the second node N2 and the second switching node LX2. A control signal A, a control signal B, a control signal C and a control signal D are configured to operably control the switch QA, the switch QB, the switch QC and the switch QD, respectively. The switch QA, the switch QB, the switch QC and the switch QD are configured to operably switch the inductor L in a pulse width modulation fashion, so as to convert the input power at the first node N1 to the first output power at the second node N2.

Figure 5:
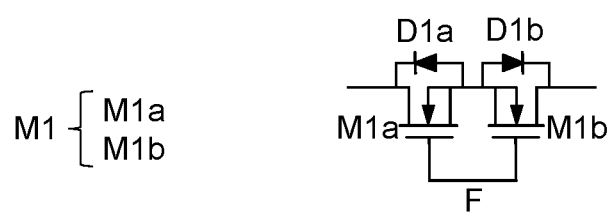
FIG. 5 shows a schematic circuit diagram of an embodiment of a first transistor in the power supply system according to the present invention.

Please refer to FIG. 5, which shows a schematic circuit diagram of an embodiment of the first transistor M1 in the power supply system 400. As shown in FIG. 5, in one embodiment, the first transistor M1 includes: a first sub-transistor M1a and a second sub-transistor M1b which are connected in series. A body diode D1a of the first sub-transistor M1a is reversely coupled to a body diode D1b of the second sub-transistor M1b, so that when the control signal F controls the first transistor M1 to be OFF, there will not be any current conducted through its body diode.

Figure 6:
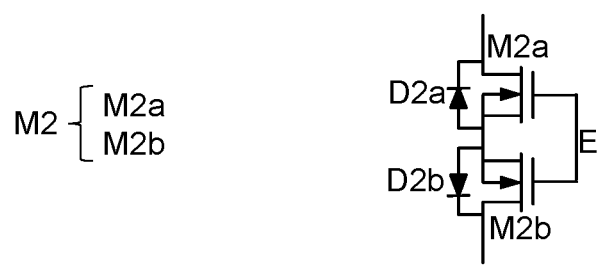
FIG. 6 shows a schematic circuit diagram of an embodiment of a second transistor in the power supply system according to the present invention.

Please refer to FIG. 6, which shows a schematic circuit diagram of an embodiment of the second transistor M2 in the power supply system 400. As shown in FIG. 6, in one embodiment, the second transistor M2 includes: a first sub-transistor M2a and a second sub-transistor M2b which are connected in series. A body diode D2a of the first sub-transistor M2a is reversely coupled to a body diode D2b of the second sub-transistor M2b, so that when the control signal E controls the second transistor M2 to be OFF, there will not be any current conducted through its body diode.

Figure 7:
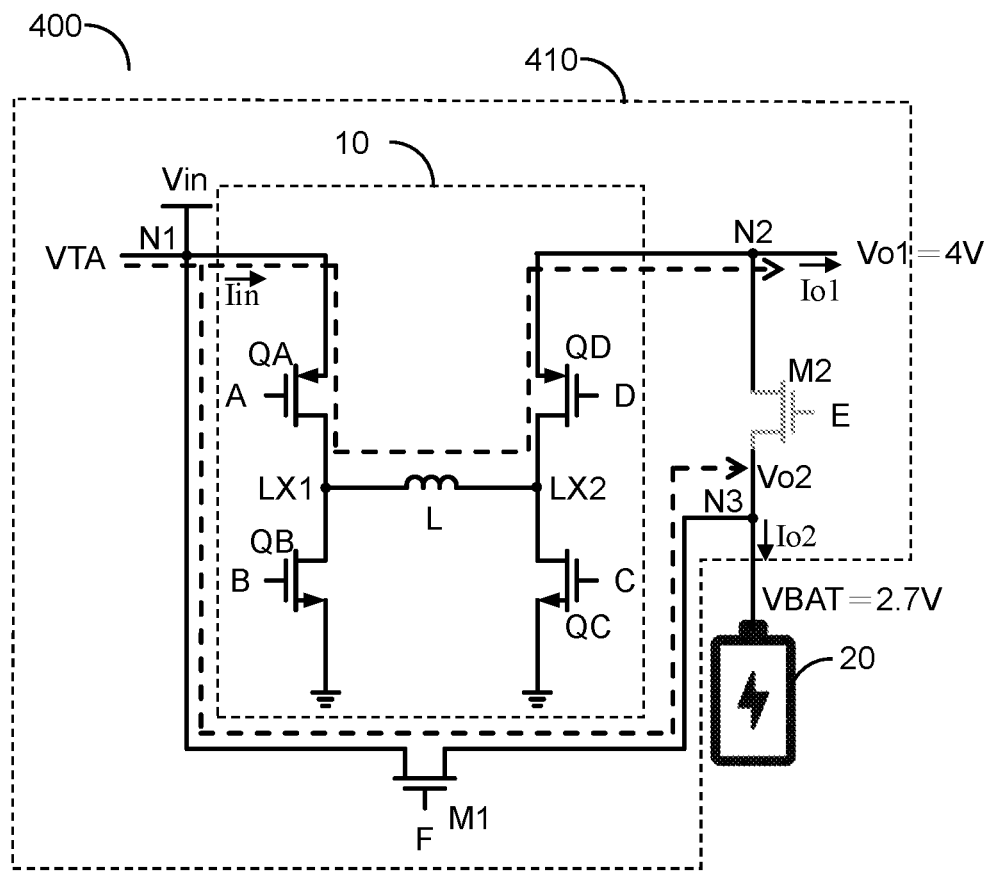
FIG. 7 to FIG. 10 explain operation mechanisms of the power supply system according to the present invention.

Please refer to FIG. 7, which shows how the power supply system 400 according to the present invention operates in one of the conversion operations. As shown in FIG. 7, in an independent power supply mode, the switching buck-boost converter 10 converts the input power at the first node N1 to the first output power at the second node N2, so as to supply power to the load circuit. In one embodiment, the first transistor M1 operates in its linear region to convert the input power at the first node N1 to the second output power at the third node N3 by linear regulation, so as to charge the battery 20 via the second output power. In another embodiment, when the first transistor M1 is ON, the third node N3 is directly electrically connected to the first node N1, so as to charge the battery 20. The second output power includes the second output voltage Vo2 and the second output current Io2. In this embodiment, the second transistor M2 is OFF. The input power corresponds to the external power supply VTA received at the first node N1. As shown in FIG. 7, in one embodiment, the first output voltage Vo1 can be different from the second output voltage Vo2.

Figure 8:
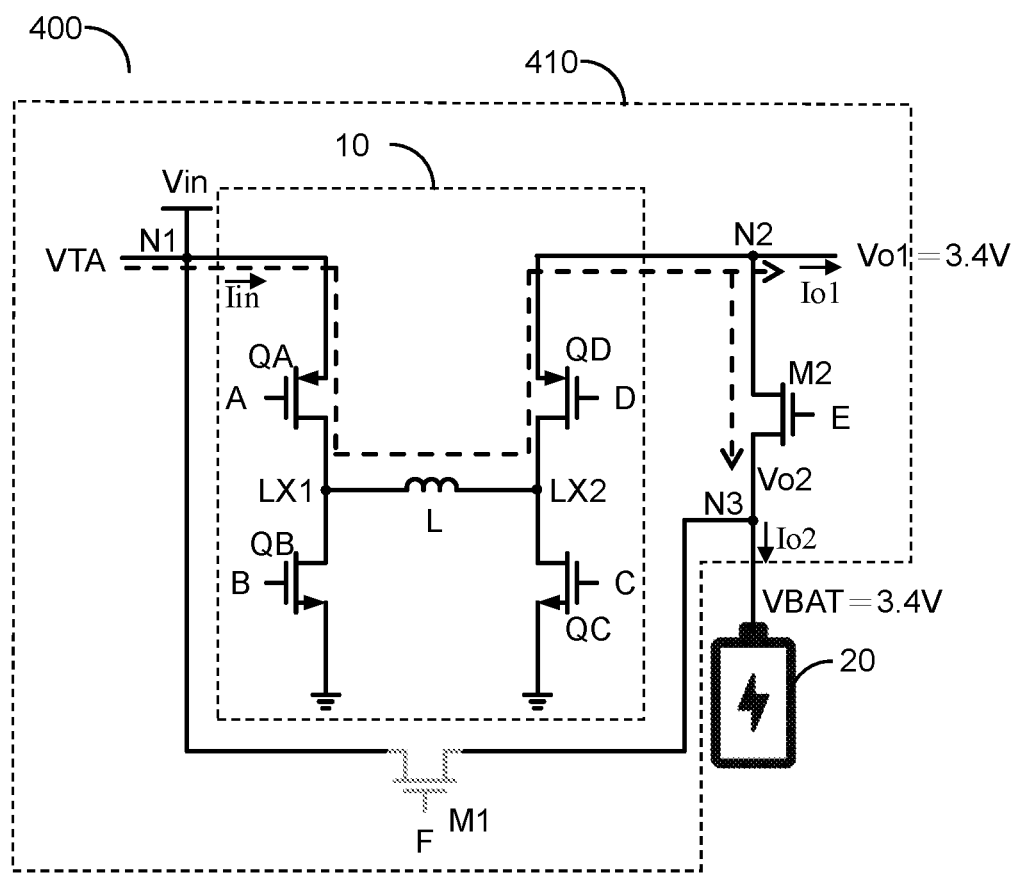

Please refer to FIG. 8, which shows how the power supply system 400 according to the present invention operates in one of the conversion operations. As shown in FIG. 8, in a case when the first output voltage Vo1 is close to the charging voltage VBAT of the battery 20 and in the parallel power supply mode, the switching buck-boost converter 10 converts the input power at the first node N1 to the first output power at the second node N2, so as to supply power to the load circuit. In one embodiment, when the second transistor M2 is ON, the second node N2 is directly electrically connected to the third node N3, so as to charge the battery 20 via the first output power. In another embodiment, in the case when the first output voltage Vo1 is not close to the charging voltage VBAT of the battery 20 and in the parallel power supply mode, the second transistor M2 operates in its linear region to convert the first output power at the second node N2 to the second output power at the third node N3 by linear regulation, so as to charge the battery 20 via the second output power. In this embodiment, the first transistor is OFF. The input power corresponds to the external power supply VTA received at the first node N1.

Figure 9:
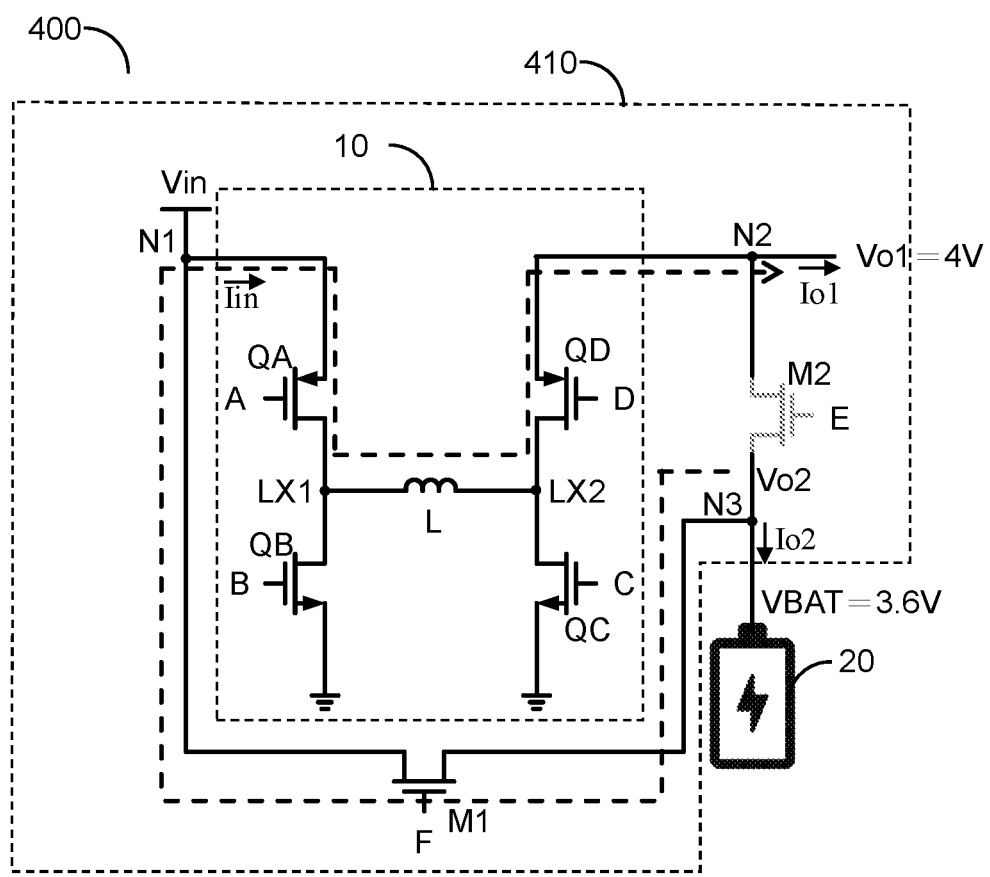

Please refer to FIG. 9, which shows how the power supply system 400 according to the present invention operates in one of the conversion operations. As shown in FIG. 9, in a case when the power supply system 400 does not receive the external power supply VTA from the first node N1 and in the battery power supply mode, the switching buck-boost converter 10 converts the input power at the first node N1 to the first output power at the second node N2, so as to supply power to the load circuit. In one embodiment, when the first transistor M1 is ON, the third node N3 is directly electrically connected to the first node N1. In another embodiment, the first transistor M1 operates in its linear region to convert the second output power at the third node N3 to the input power at the first node N1 by linear regulation. The input power corresponds to the power supply provided by the battery 20 and received at the first node N1. In this embodiment, the second transistor M2 is OFF.

Figure 10:
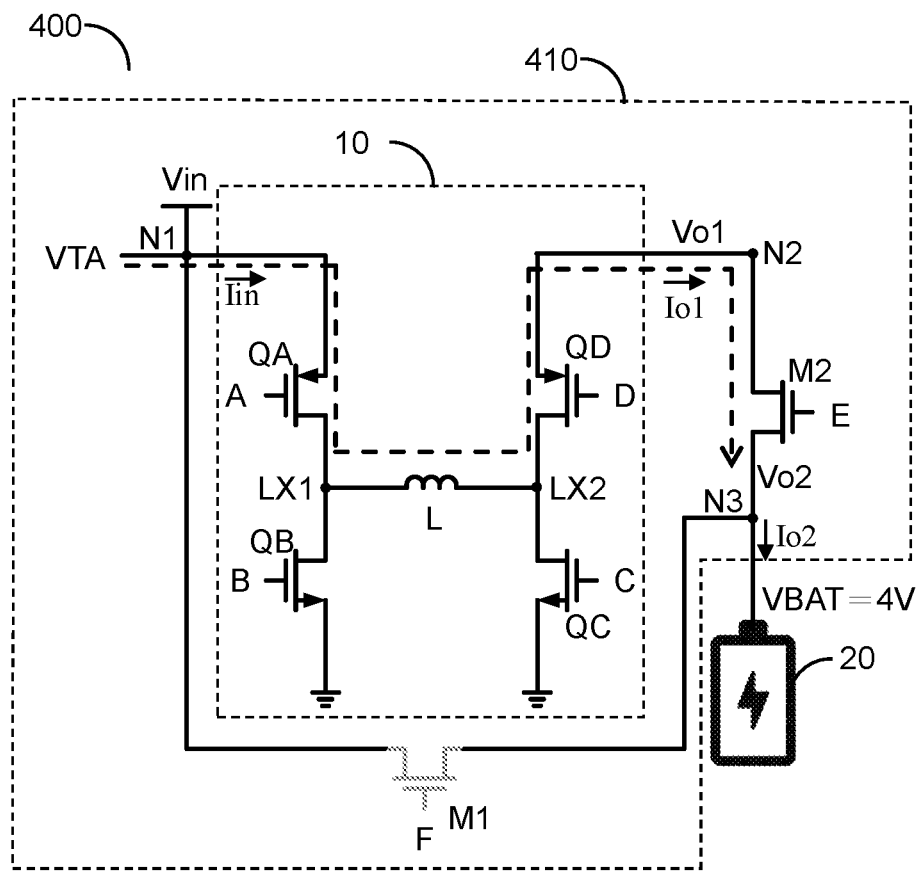

Please refer to FIG. 10, which shows how the power supply system 400 according to the present invention operates in one of the conversion operations. As shown in FIG. 10, in a case when the load circuit is absent and in the battery charging power supply mode, the switching buck-boost converter 10 converts the input power at the first node N1 to the first output power at the second node N2. In one embodiment, when the second transistor M2 is ON, the second node is directly electrically connected to the third node N3, so as to charge the battery 20 via the first output power. In another embodiment, the second transistor M2 operates in its linear region to convert the first output power at the second node N2 to the second output power at the third node N3 by linear regulation, so as to charge the battery 20 via the second output power. In this embodiment, the first transistor M1 is OFF. The input power corresponds to the external power supply VTA received at the first node N1.

Please still refer to FIG. 10. Ina case when the load circuit is absent and in the bypass mode, the switch QA and the switch QD are always ON, whereas, the switch QB and the switch QC are always OFF, so that the first node N1 is electrically connected to the second node N2. When the first transistor M1 is ON, the third node N3 is directly electrically connected to the first node N1. In this embodiment, the second transistor M2 is OFF, so that the external power supply VTA directly charges the battery 20. In one embodiment, in the above-mentioned bypass mode, the external power supply VTA provides a constant current. Under such situation, the switching buck-boost converter 10 lets the constant current directly charge the battery 20.

The present invention provides a power supply system and a multipath power converter circuit thereof. Advantages of the present invention include: that the present invention can provide multiple power supply paths and charging paths, to charge a battery and/or to supply power to a load circuit in a flexible manner depending upon practical needs; that the present invention can reduce the required number of switches and the required number of inductors; and that the present invention can improve charging efficiency, reduce power consumption, reduce circuit size and reduce manufacturing cost.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply system, comprising:
    a switching buck-boost converter, including plural conversion switches, wherein the plural conversion switches are configured to periodically operate an inductor so as to convert an input power at a first node to a first output power at a second node in an inductive power conversion manner, wherein a first output voltage of the first output power is higher than, lower than or equal to an input voltage of the input power;
    a battery coupled to a third node;
    a first transistor directly coupled between the first node and the third node and controlled by a dedicated control signal, wherein the first transistor is separate from the plural conversion switches; and
    a second transistor coupled between the second node and the third node;
    wherein the switching buck-boost converter, the first transistor and the second transistor are configured to supply power to a load circuit and/or to charge the battery;
    wherein the load circuit is coupled to the second node in a removable manner to receive power.

2. The power supply system of claim 1, wherein in an independent power supply mode, the switching buck-boost converter is configured to operably convert the input power at the first node to the first output power at the second node, so as to supply power to the load circuit, wherein the first transistor is configured to operate in a a linear region to operably convert the input power at the first node to a second output power at the third node by linear regulation, so as to charge the battery via the second output power, wherein the second transistor is OFF, and wherein the input power corresponds to an external power supply received at the first node.

3. The power supply system of claim 1, wherein in a parallel power supply mode, the switching buck-boost converter is configured to operably convert the input power at the first node to the first output power at the second node, so as to supply power to the load circuit, wherein when the second transistor is ON, the first output power is electrically connected to the third node, so as to charge the battery via the first output power, wherein the first transistor is OFF, and wherein the input power corresponds to an external power supply received at the first node.

4. The power supply system of claim 1, wherein in a battery power supply mode, the switching buck-boost converter is configured to operably convert the input power at the first node to the first output power at the second node, so as to supply power to the load circuit, wherein when the first transistor is ON, the third node is electrically connected to the first node, wherein the input power corresponds to a power supply provided by the battery at the first node, and wherein the second transistor is OFF.

5. The power supply system of claim 1, wherein in a battery charging power supply mode, the switching buck-boost converter is configured to operably convert the input power at the first node to the first output power at the second node, wherein when the second transistor is ON, the first output power is electrically connected to the third node, so as to charge the battery via the first output power, wherein the first transistor is OFF, and wherein the input power corresponds to an external power supply received at the first node.

6. The power supply system of claim 1, wherein the switching buck-boost converter includes:
    a first switch coupled between the first node and a first switching node;
    a second switch coupled between the first switching node and a ground level;
    a third switch coupled between a second switching node and the ground level; and
    a fourth switch coupled between the second node and the second switching node;
    wherein the first switch, the second switch, the third switch and the fourth switch are configured to operate the inductor, so as to convert the input power at the first node to the first output power at the second node.

7. The power supply system of claim 6, wherein the input power corresponds to an external power supply received at the first node, wherein in a bypass mode, the first switch and the fourth switch are always ON, whereas, the second switch and the third switch are always OFF, so that the first node is electrically connected to the second node, wherein when the first transistor is ON, the third node is electrically connected to the first node, wherein the second transistor is OFF, so that the external power supply directly charges the battery.

8. The power supply system of claim 7, wherein in the bypass mode, the external power supply provides a constant current, wherein the buck-boost converter is switching configured to directly charge the battery by the constant current.

9. The power supply system of claim 1, wherein the first transistor includes:
    a first sub-transistor and a second sub-transistor which are connected in series, wherein a body diode of the first sub-transistor is reversely coupled to a body diode of the second sub-transistor.

10. The power supply system of claim 1, wherein the second transistor includes:

a first sub-transistor and a second sub-transistor which are connected in series, wherein a body diode of the first sub-transistor is reversely coupled to a body diode of the second sub-transistor.

11. A multipath power converter circuit, comprising:
a switching buck-boost converter, including plural conversion switches, wherein the plural conversion switches are configured to periodically operate an inductor so as to convert an input power at a first node to a first output power at a second node in an inductive power conversion manner, wherein a first output voltage of the first output power is higher than, lower than or equal to an input voltage of the input power;
a first transistor directly coupled between the first node and a third node and controlled by a dedicated control signal, wherein the first transistor is separate from the plural conversion switches; and
a second transistor coupled between the second node and the third node;
wherein the switching buck-boost converter, the first transistor and the second transistor are configured to supply power to a load circuit and/or to charge a battery, wherein the battery is coupled to the third node;
wherein the load circuit is coupled to the second node in a removable manner to receive power.

12. The multipath power converter circuit of claim 11, wherein in an independent power supply mode, the switching buck-boost converter is configured to operably convert the input power at the first node to the first output power at the second node, so as to supply power to the load circuit, wherein the first transistor is configured to operate in a linear region to operably convert the input power at the first node to a second output power at the third node by linear regulation, so as to charge the battery via the second output power, wherein the second transistor is OFF, and wherein the input power corresponds to an external power supply received at the first node.

13. The multipath power converter circuit of claim 11, wherein in a parallel power supply mode, the switching buck-boost converter is configured to operably convert the input power at the first node to the first output power at the second node, so as to supply power to the load circuit, wherein when the second transistor is ON, the first output power is electrically connected to the third node, so as to charge the battery via the first output power, wherein the first transistor is OFF, and wherein the input power corresponds to an external power supply received at the first node.

14. The multipath power converter circuit of claim 11, wherein in a battery power supply mode, the switching buck-boost converter is configured to operably convert the input power at the first node to the first output power at the second node, so as to supply power to the load circuit, wherein when the first transistor is ON, the third node is electrically connected to the first node, wherein the input power corresponds to a power supply provided by the battery at the first node, and wherein the second transistor is OFF.

15. The multipath power converter circuit of claim 11, wherein in a battery charging power supply mode, the switching buck-boost converter is configured to operably convert the input power at the first node to the first output power at the second node, wherein when the second transistor is ON, the first output power is electrically connected to the third node, so as to charge the battery via the first output power, wherein the first transistor is OFF, and wherein the input power corresponds to an external power supply received at the first node.

16. The multipath power converter circuit of claim 11, wherein the switching buck-boost converter includes:
a first switch coupled between the first node and a first switching node;
a second switch coupled between the first switching node and a ground level;
a third switch coupled between a second switching node and the ground level; and
a fourth switch coupled between the second node and the second switching node;
wherein the first switch, the second switch, the third switch and the fourth switch are configured to operate the inductor, so as to convert the input power at the first node to the first output power at the second node.

17. The multipath power converter circuit of claim 16, wherein the input power corresponds to an external power supply received at the first node, wherein in a bypass mode, the first switch and the fourth switch are always ON, whereas, the second switch and the third switch are always OFF, so that the first node is electrically connected to the second node, wherein when the first transistor is ON, the third node is electrically connected to the first node, wherein the second transistor is OFF, so that the external power supply directly charges the battery.

18. The multipath power converter circuit of claim 17, wherein in the bypass mode, the external power supply provides a constant current, wherein the switching buck-boost converter is configured to directly charge the battery by the constant current.

19. The multipath power converter circuit of claim 11, wherein the first transistor includes:
a first sub-transistor and a second sub-transistor which are connected in series, wherein a body diode of the first sub-transistor is reversely coupled to a body diode of the second sub-transistor.

20. The multipath power converter circuit of claim 11, wherein the second transistor includes:
a first sub-transistor and a second sub-transistor which are connected in series, wherein a body diode of the first sub-transistor is reversely coupled to a body diode of the second sub-transistor.

* * * * *